United States Patent [19]

Cohen

[11] Patent Number: 4,755,410
[45] Date of Patent: Jul. 5, 1988

[54] ADHESIVE COPPER STRIP WITH AN OPAQUE COVERING

[75] Inventor: Lewis S. Cohen, Hingham, Mass.

[73] Assignee: Venture Tape Corp., Rockland, Mass.

[21] Appl. No.: 875,265

[22] Filed: Jun. 17, 1986

[51] Int. Cl.⁴ .................... B32B 3/00; B32B 7/10; C09J 7/02
[52] U.S. Cl. .................... 428/58; 428/192; 428/323; 428/335; 428/340; 428/343; 428/352; 428/354; 428/434
[58] Field of Search ............... 428/58, 192, 433, 434, 428/352, 41, 354, 38, 323, 335, 340, 343

[56] References Cited

U.S. PATENT DOCUMENTS 3,420,728  1/1969  Haverstock .................. 428/38
4,255,475  3/1981  DelGrande .................. 428/58 X

*Primary Examiner*—Thomas J. Herbert
*Attorney, Agent, or Firm*—Wolf, Greenfield & Sacks

[57] ABSTRACT

An adhesive copper strip is provided with an opaque covering on the adhesive side thereof. The opaque covering may be provided in one of two ways. In one embodiment, a coating of black acrylic or epoxy is applied to the copper strip beneath the adhesive layer. In a second embodiment, the adhesive contains carbon particles dispersed uniformly throughout the adhesive in sufficient quantity to render the adhesive opaque.

9 Claims, 1 Drawing Sheet 4,755,410

ADHESIVE COPPER STRIP WITH AN OPAQUE COVERING

FIELD OF THE INVENTION

This invention relates generally to copper, pressure sensitive adhesive tapes, and more particularly to adhesive copper strips which are used to produce stained glass windows and other glass objects.

BACKGROUND OF THE INVENTION

Stained glass windows, and other glass artifacts, traditionally have been manufactured by cutting panes of different colored glass into sections having a desired shape and size, and assembling these sections of glass into a composite to form a design or picture. Traditionally, a lead based solder has been applied to the adjoining edges of the sections of glass to hold the sections together. However, since solder does not adhere well to glass, an intermediate layer formed of another substance is required. Copper is the material most often used in recent times, since, in thin strips, it is maleable, and since solder adheres well to the surface of the copper.

In making stained glass windows and artifacts, a strip of copper is applied to each glass edge and the edges of the strips are folded over onto the outer surfaces of the glass. Starting in the late 1800's, these copper strips were secured to the edges of the glass sections using beeswax. After pressure sensitive adhesives were developed, the copper strips were provided with a layer of adhesive along one side for application to the glass edges. After the glass sections have been placed in the desired relationship to one another, molten solder is applied uniformly along the adjoining edges of the glass sections, covering the exposed edges of the copper strips disposed on the outer surfaces of the glass sections and the spaces between adjoining edges of the sections. A bead of solder is formed bridging the spaces between adjoining edges to attach each section of glass to the sections immediately adjoining it.

The use of copper strips for stained glass windows and artifacts is often found not to be aesthetically pleasing. In the first place, the glass does not have an authentic, antique look. Although the solder bead assumes a somewhat darkened color with time, the copper strip retains its color, since it is sealed between the solder bead and the glass. Since the adhesive used to bond the copper strip to the glass is generally transparent, if the window or artifact is viewed at a slight angle, the copper color on the backside of the copper strip is readily visible around the edges of each section of glass. It is readily apparent by looking at such windows from an angle that copper was used in their manufacture, particularly since the copper color clashes with the darker color of the aged solder bead. Secondly, this copper color and the reflected light can detract from the design and the colored effect of the glass. Thirdly, the copper surface readily reflects light and this reflected light is both annoying and detracting from the design of the window or artifact.

An object of this invention is to provide an adhesive copper strip which can be used for producing stained glass windows in which the copper is not visible after application to the window.

Another object of the present invention is to produce an adhesive copper strip whose adhesive side has a blackened coloration.

SUMMARY OF THE INVENTION

The foregoing and other objects of this invention are achieved by providing the back side or adhesive side of the adhesive copper strip with an opaque covering. This covering should have a dark appearance similar to the blackened appearance of the aged solder found in stained glass artifacts and windows. This opaque covering can be achieved in several ways. In one embodiment, the back side of the strip of copper is provided with a coating of a dark material between the adhesive layer and the copper strip. This dark material typically is a black acrylic or epoxy. In another embodiment, this opaque covering is provided by coating the back side of the strip of copper with an adhesive which is itself opaque when applied to the copper strip. Typically, in this embodiment, the adhesive is provided with carbon particles which are uniformly dispersed throughout the adhesive.

By providing the back or adhesive side of the strip of copper with an opaque, black coloration, when it is viewed through the glass at an angle, no copper color is visible and the copper strip will appear to have roughly the same color as the solder bead used in holding the glass sections together. In this manner, stained glass windows or other glass artifacts made using the adhesive copper strip of this invention will have a reasonably authentic, antique look, and it will not be readily apparent that copper was used in the manufacture thereof.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Figure 1:
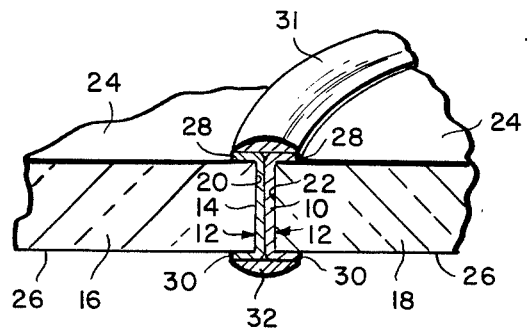
FIG. 1 is a partially cutaway, perspective cross-sectional view of two sections of glass joined together using the adhesive copper strip of this invention.

Referring now to the drawings, and more particularly to FIG. 1 thereof, this invention will be described with particular reference to its use in the production of stained glass windows or other artifacts which are formed of a plurality of sections of glass which are joined together. FIG. 1 shows two sections 16 and 18 of glass which are joined together along respective edges 20 and 22. The adhesive copper strip 10 of this invention is shown applied to each edge 20 and 22. Strips 10 are sufficiently wide, so that they may be folded to form overlapping portions 28 extending along the edge of upper surfaces 24 of sections 16 and 18, and overlapping portions 30 extending along the edge of lower surfaces 26 of sections 16 and 18. Strips 10 extend along the entire length of edges 20 and 22 of respective sections 16 and 18. In use, strips 10 are adhesively secured to edges 20 and 22 prior to installation, and thereafter edges 20 and 22 are placed in the adjoining relationship shown in FIG. 1. Then, molten solder is applied to overlapping portions 28 of both copper strips 10 along upper surfaces 24 of sections 16 and 18, and to overlapping portions 30 of both copper strips 10 along lower surfaces 26 of sections 16 and 18. The solder adheres securely to portions 28 and 30 of copper strips 10 and forms one bead 31 bridging adjoining portions 28 and another bead 32 bridging adjoining portions 30. Beads 31 and 32 thus bond sections 16 and 18 together.

In prior art adhesive copper strips, the adhesive used is generally transparent, and is applied directly to the undersurface of the copper strip. Thus, a copper color is visible through sections 16 and 18, and the copper color reflects impinging light. This copper color is particularly noticeable when sections 16 and 18 are viewed at a slight angle. This copper color contrasts with the darker color of the lead when it ages, and the resulting product does not have an authentic, antique look. It is readily apparent that a copper strip was used to produce the window or artifact. Also, the copper color and reflected light can interfere with the design. As a result, the product is not aesthetically pleasing.

Figure 2:
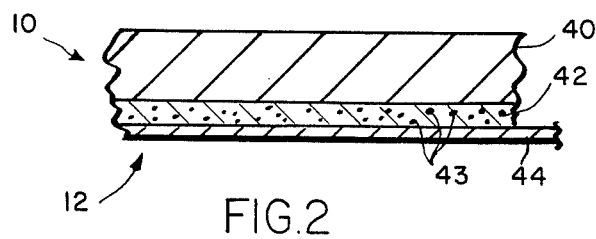
FIG. 2 is a cutaway, planar cross-sectional view of one embodiment of the adhesive copper strip of this invention.

One embodiment of this invention will now be described with particular reference to FIG. 2. Strip 10 of FIG. 2 comprises three layers, a copper layer 40, an adhesive layer 42, and a release liner 44. Copper layer 40 is typically a foil formed of substantially solid copper. Layer 40 must be thin enough to be sufficiently maleable for wrapping about edges 20 or 22 of a section of glass, but it must be sufficiently strong to provide a tight bond between the glass section and solder bead 32. In a preferred embodiment, copper layer 40 has a thickness in the range of from about 1.0 to about 1.5 mils with the preferred thickness being about 1.35 mils. Layer 40 is a 110 copper alloy of electrolytic grade and zero temper. Release liner 44 may be any known release liner for use with a pressure sensitive adhesive, and it is removed prior to application of strip 10 to edges 20 and 22. The preferred release liner is a Ludlow 7013.

Adhesive layer 42 is typically comprised of a pressure sensitive acrylic adhesive which has black particles 43 dispersed uniformly throughout it.

Adhesive layer 42 should be provided with a thickness sufficient to create a strong bond between the copper layer 40 and the glass, but it should not be too thick. In a preferred embodiment, the dry thickness of layer 42 is approximately 1.5 mils, and the dry coating weight of the adhesive is about 33.6 grams per square yard or 1.198 ounces per square yard. The size and concentration of particles 43 must be such that particles 43 do not interfere with the prope operation of the adhesive, but particles 43 must be sufficiently large and of sufficient concentration to provide an opaque covering in a thickness of 1.5 mils through which copper layer 40 is not visible. Also, preferably, the black particles dispersed in the adhesive should, in combination with the basic adhesive color, provide a darkened color or hue which closely approximates that of solder beads 31 and 32 after they have aged. Particles 43 should be uniformly dispersed throughout the adhesive, so that no thin spots appear in the adhesive layer.

In the preferred embodiment, the particles which produce the ideal color and which render layer 42 opaque are carbon particles, having a particle size of about 24 nanometers. The carbon particles should constitute from about 16% to about 19.5% by weight of the resulting dry adhesive layer.

In a preferred embodiment, adhesive layer 42 is a mixture of a pressure sensitive adhesive and a suspension containing black particles. The adhesive and suspension are mixed together until the black particles are uniformly dispersed throughout the mixture, and then the mixture is applied to the back side of copper layer 40.

An exemplary adhesive is one produced by National Starch and Chemical Corp. of Bridgewater, New Jersey and sold under the product designation 80-1054. This particular adhesive contains 47.5% solids and is optically transparent. The solvent content is 33% ethyl acetate, 35% isopropyl alcohol, 2.9% heptane and 4% toluene. An exemplary suspension is that produced by Pan Chemical Corporation of New Jersey and sold under the product designation FP-77-313. The FP-77-313 product is a suspension of carbon particles in methyl ethyl ketone and contains 51% carbon particles by weight.

If the National Starch 80-1054 and Pan Chemical FP-77-313 products are used for making layer 42, an acceptable product can be produced by mixing 1 part by weight of the FP-77-313 suspension with six parts by weight of the 80-1054 adhesive. The acceptable tolerance in such a mixture is ±5 percent. After measuring and weight checking, the FP-77-313 suspension is mixed with the 80-1054 adhesive for approximately 45 minutes, using a lightening mixer at medium speed, until the two products are fully blended together.

The resulting mixture should contain no more than 40% by weight of solids. If the solids are greater than 40%, a water free solvent must be added to reduce the solids content to less than 40%. Suitable solvents are aliphatic and aromatic hydrocarbons, ketones, esters and alcohols. Thereafter, the resulting mixture is applied to layer 40 in a known manner to produce the indicated dry coating weights. The mixture on layer 40 is then cured in an oven in a conventional manner to drive off the solvents in both the FP-77-313 suspension and the 80-1054 adhesive. Nothing remains of the FP-77-313 suspension except the carbon particles, and most of the solvent in the 80-1054 is removed. After all solvents have been removed, the 80-1054 adhesive constitutes about 82.3% by weight of the mixture and the carbon particles constitute about 17.6% by weight of the mixture. The permitted tolerance for the carbon particles is within the range of from about 16% to about 19.5% by weight of the mixture.

Figure 3:
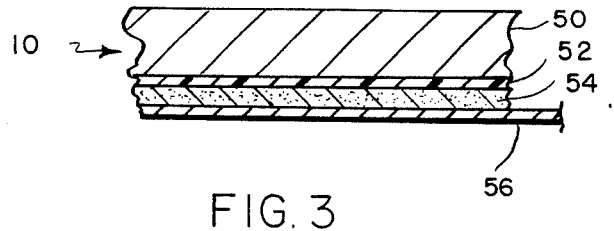
FIG. 3 is a cutaway, planar cross-sectional view of another embodiment of the adhesive strip of this invention.

An alternative embodiment of this invention will now be described with particular reference to FIG. 3. In this embodiment, tape 10 of the invention comprises a copper layer 50, a black coating 52 secured to one side of layer 50, an adhesive layer 54, and a release liner 56. Copper layer 50 is again formed of a strip of copper, and can be identical to layer 40 of FIG. 2. Similarly, release liner 56 can be any known release liner, and in a preferred embodiment, a Ludlow 7013 release liner is used. Adhesive layer 54 can be any known pressure sensitive adhesive. Preferably, a pressure sensitive acrylic solution is used, such as an adhesive sold by National Starch & Chemical Corp. under the product designation 80-1054. Adhesive layer 54 should have a dry coating weight of about 33.6 grams per square yard or 1.198 ounces per square yard and a dry thickness of about 1.5 mil.

Coating 52 can be formed of any material which is of a blackened coloration and which is opaque when applied to copper layer 50 and to which adhesive layer 54 will firmly adhere. Typical examples include any black colored epoxy or acrylic material which can be applied as a coating. Coating 52 is applied first to copper layer 50 in a known manner and allowed to harden before application of adhesive layer 54 thereto.

By using the copper strip of this invention, artisans and others who are making stained glass windows or other glass artifacts can produce a superior product which does not exhibit the undesirable copper color around the edges of the glass sections resulting from the use of conventional copper strips. The opaque coating of the present invention has a coloration substantially similar to the color of the solder bead joining the glass sections together. As a result, the stained glass window or other product has a more authentic, antique look, and is aesthetically pleasing.

Modifications and improvements will occur within the scope of this invention to those skilled in the art, and the above description is intended as exemplary only. The scope of this invention is defined only by the following claims and their equivalents.

What is claimed is:

1. A composite formed of interconnected sections of glass comprising:
   a first section of glass having a first edge and opposed front and back surfaces;
   a second section of glass having a second edge and opposed front and back surfaces, said second edge of said second section being in confronting, closely spaced relation with said first edge of said first section;
   a first strip of copper foil adhesively secured on a back side thereof to said first edge of said first section and to adjacent portions of said front and back surfaces of said first section;
   a second strip of copper foil adhesively secured on a back side thereof to said second edge of said second section and to adjacent portions of said front and back surfaces of said second section, each of said first and said second strips of copper foil comprising a layer a copper, a layer of a pressure sensitive adhesive disposed on a back side of said layer of copper, and opaque means covering said back side of said layer of copper, said opaque means comprising a quantity of black particles dispersed uniformly throughout said adhesive layer and preventing said back side of said layer of copper from being visible; and
   a bead of solder for securing together said first and said second strips of copper foil.

2. An adhesive copper strip comprising:
   a layer of copper foil having an exposed upper side and a back side;
   a layer of a pressure sensitive adhesive disposed on said back side of said copper layer; and
   a quantity of black particles dispersed uniformly throughout said adhesive layer for preventing said back side of said copper layer from being visible.

3. A strip as recited in claim 2 wherein said black particles comprise carbon particles.

4. A strip as recited in claim 2 wherein said particles comprise in the range of from about 16% to about 19.5% by weight of said adhesive layer.

5. A strip as recited in claim 2 wherein the particle size of said particles is about 24 nanometers.

6. A strip as recited in claim 2 wherein the thickness of said adhesive layer is about 1.5 mil and wherein the dry coating weight of said adhesive layer is about 1.198 ounces per square yard.

7. An adhesive copper strip for use in securing together sections of glass with solder, said strip comprising:
   a layer of copper foil having an exposed upper side and a back side; and
   a layer of a pressure sensitive adhesive secured to said back side of said copper foil layer, said adhesive layer comprising in the range of from about 16 percent to about 19.5 percent by weight of carbon particles having a size of about 24 nanometers dispersed uniformly throughout said adhesive layer to render said adhesive layer opaque, the thickness of said adhesive layer being about 1.5 mils.

8. An adhesive copper strip for use in securing together sections of glass with solder, said strip comprising:
   a layer of copper foil having an exposed upper side and a back side;
   an opaque coating of a selected one of black acrylic and a black epoxy material covering said back side of said copper layer; and
   a layer of a pressure sensitive adhesive secured to said coating.

9. An adhesive copper strip comprising:
   a layer of copper foil having an exposed upper side, and a back side;
   a layer of a pressure sensitive adhesive disposed on said back side of said copper layer; and
   a coating of a darkened, opaque material comprising a selected one of a black epoxy and a black acrylic material applied to said back side of said layer of copper foil between said back side of said copper foil and said adhesive layer for preventing said back side of said copper from being visible.

* * * * *